(12) United States Patent
Ahuja et al.

(10) Patent No.: US 8,204,034 B2
(45) Date of Patent: Jun. 19, 2012

(54) METHOD AND DEVICE FOR TRANSMITTING DATA PACKETS

(75) Inventors: Ramandeep Ahuja, Chicago, IL (US); Narayanan Venkitaraman, Palatine, IL (US); Mario F. Derango, Cary, IL (US); Surender Kumar, Naperville, IL (US); Anthony R. Metke, Naperville, IL (US); Vidya Narayanan, San Diego, CA (US)

(73) Assignee: Motorola Solutions, Inc., Schaumburg, IL (US)

( * ) Notice: Subject to any disclaimer, the term of this patent is extended or adjusted under 35 U.S.C. 154(b) by 628 days.

(21) Appl. No.: 11/621,803

(22) Filed: Jan. 10, 2007

(65) Prior Publication Data

US 2008/0165786 A1    Jul. 10, 2008

(51) Int. Cl.
*H04J 3/24* (2006.01)
*G06F 9/00* (2006.01)
*G06F 15/16* (2006.01)
*G06F 17/00* (2006.01)

(52) U.S. Cl. ......................................... 370/349; 726/15
(58) Field of Classification Search .................. 370/349; 726/15
See application file for complete search history.

(56) References Cited

U.S. PATENT DOCUMENTS

| 7,036,143 | B1 * | 4/2006 | Leung et al. ..................... 726/15 |
| 7,159,035 | B2 * | 1/2007 | Garcia-Luna-Aceves et al. .............................. 709/241 |
| 7,228,421 | B1 * | 6/2007 | Huang et al. .................... 713/171 |
| 7,349,360 | B2 * | 3/2008 | Gutierrez et al. ............. 370/315 |
| 2002/0145978 | A1 * | 10/2002 | Batsell et al. ................. 370/238 |
| 2004/0125776 | A1 * | 7/2004 | Haugli et al. ................. 370/338 |
| 2005/0198372 | A1 | 9/2005 | Narayanan et al. |
| 2005/0254430 | A1 * | 11/2005 | Clark et al. ................... 370/241 |
| 2006/0250951 | A1 * | 11/2006 | Ueda et al. .................... 370/217 |
| 2007/0076673 | A1 * | 4/2007 | Joshi ............................. 370/338 |

* cited by examiner

*Primary Examiner* — Marivelisse Santiago Cordero
(74) *Attorney, Agent, or Firm* — Randi L. Karpinia

(57) ABSTRACT

A method for transmitting a packet from a transmitting node to a destination node in a communication network can enable improved network efficiency. The method includes receiving and storing identification information concerning at least one foreign node that is directly reachable in the communication network (block 505). It is then determined, using the identification information, whether the destination node is directly reachable in the communication network (block 510). Based on whether the destination node is directly reachable in the communication network, it is then determined whether to transmit the packet to the destination node using a tunneling protocol or without using a tunneling protocol (block 515). The packet is then transmitted from the transmitting node to the destination node (block 520).

16 Claims, 6 Drawing Sheets

METHOD AND DEVICE FOR TRANSMITTING DATA PACKETS

FIELD OF THE INVENTION

The present invention relates generally to wireless communication devices, and in particular to determining whether a data packet should be directly transmitted to a node, or indirectly transmitted to the node through a tunnel.

BACKGROUND

The Internet protocol (IP) is used to connect network nodes by routing data packets to IP addresses assigned to the nodes. IP addresses were traditionally associated with a fixed network location. Thus if a node moved from one location to another, a new IP address needed to be assigned to the node at the node's new location. That made roaming across networks difficult, as it was not possible to maintain the continuity of an Internet Protocol (IP) application session when a node changed its IP address. The Internet Engineering Task Force (IETF) therefore developed a standards based protocol called Mobile IP that enables a node to maintain a unique, fixed, home IP address even when the node moves from one network to another.

Mobile IP employs two IP addresses, a home IP address that remains constant wherever a node is located, and a "care-of" IP address that changes when a node moves to a new network. Using Mobile IP, a data packet intended for a roaming node is first received at the roaming node's home IP address. The data packet is then encapsulated by a Home Agent, which typically resides in a Customer Enterprise Network (CEN), and is tunneled to the care-of IP address. The data packet sourced by the mobile node from a foreign network is tunneled to the home agent which de-capsulates and forwards the data packet to the destination. Because its home IP address remains constant, such a roaming node is able to maintain the continuity of Internet Protocol (IP) application sessions even as the node moves across networks. In addition, to enable secure connectivity, the CEN may provide a Virtual Private Network (VPN) Server that uses a tunnel, for example using IPSec Encapsulating Security Payload-ESP protocol, to encrypt/de-crypt all communication to/from mobile nodes that have moved away from the CEN.

Mobile IP is sometimes used in combination with ad hoc and mobile networks. An ad hoc network is a collection of nodes that communicate by forming a multi-hop radio network without the need of infrastructure. Nodes in an ad hoc network forward information (e.g., frames) to other nodes by selecting one of the available routes to a destination node based on several parameters, such as link quality and round trip time. Generally ad hoc networks do not have a fixed topology. Nodes can dynamically join and leave an ad hoc network, and ad hoc networks can vary in degree of mobility. Further, an ad hoc network typically can heal itself by selecting alternate routes to a destination node when a first route is blocked, and thus each node in an ad hoc network can be viewed as a router. The dynamic formation of ad hoc networks, the ability to setup a network anywhere without the need of infrastructure, and the self healing characteristics make ad hoc networks useful in various situations, such as public safety incident scenes, where infrastructure connectivity might not be available.

In a mobile network, a mobile router provides connectivity to a group a hosts/routers connected to the mobile router. The hosts connected to a mobile router may share a home subnetwork with the mobile router (called home mobile nodes) or the hosts may have a different home subnetwork (called visiting mobile nodes). A mobile router typically uses mobile IP to receive packets from a home agent in the CEN and distribute packets to nodes connected to the mobile router's mobile network. A mobile router may have different levels of infrastructure connectivity (for example, connections to the CEN or connections only to a high risk building). A mobile router itself may be part of an ad hoc network. If a visiting node moves within range of an ad hoc network and seeks to transmit a data packet to a receiving node in the ad hoc network, a most efficient path for the data packet might be a single hop path including a direct peer to peer transmission of the data packet from the visiting node to the receiving node. However, if the visiting node is employing Mobile IP or a VPN, a Mobile IP or VPN application can force the visiting node to transmit the data packet to the receiving node through a much less efficient path. Such a less efficient path can include tunneling the data packet to the receiving node's Home Agent or VPN Server located in another network, and then transmitting the data packet from that network back to the receiving node.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
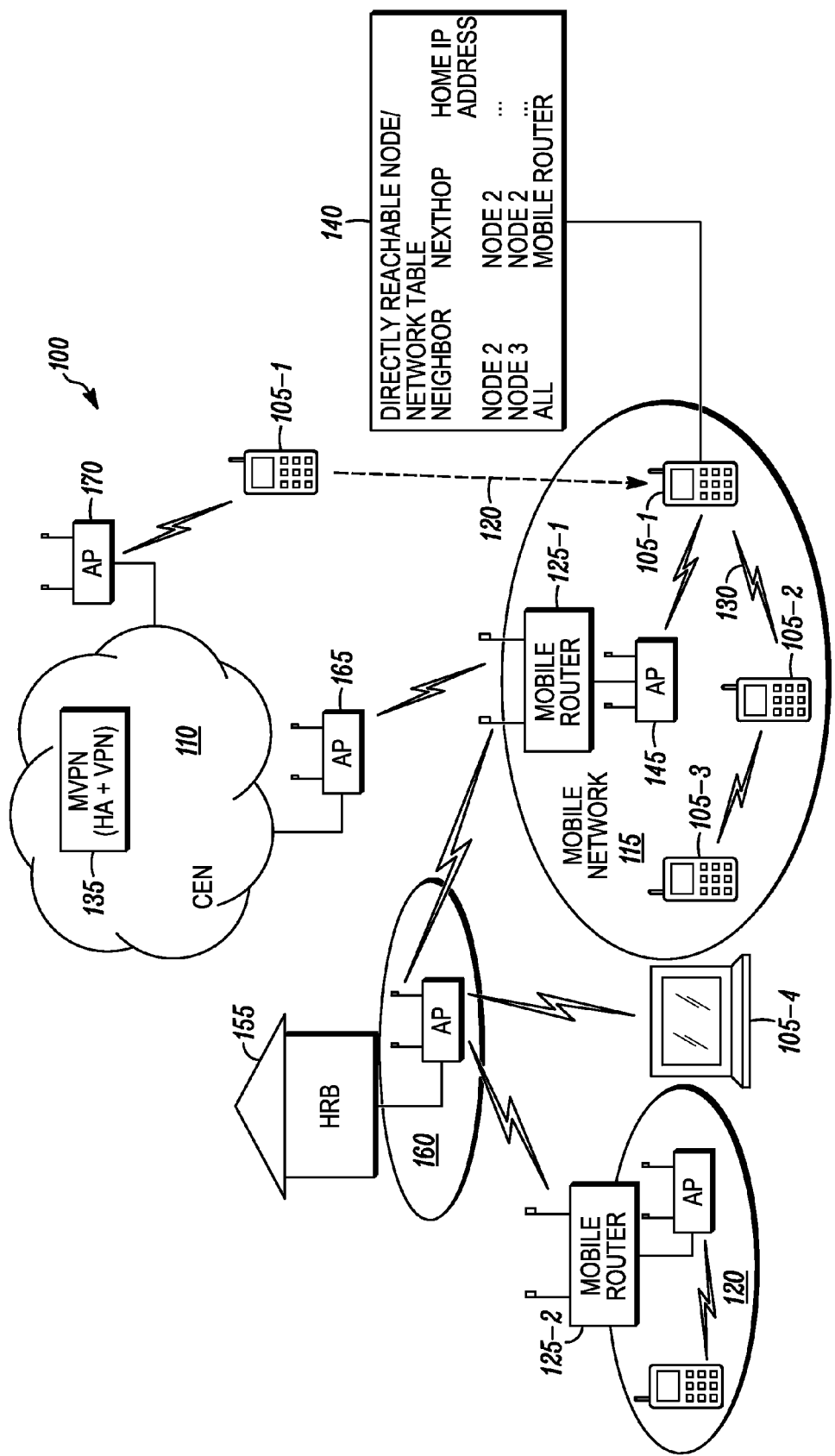
FIG. 1 is a network diagram illustrating a method of transmitting a data packet from a first node to a second node, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and device for transmitting data packets. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of transmitting data packets as described herein. The non-processor circuits may include, but are not limited to, a radio receiver, a radio transmitter, signal drivers, clock circuits, power source circuits, and user input devices. As such, these functions may be interpreted as steps of a method for transmitting data packets. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

According to one aspect, some embodiments of the present invention comprise a method for routing packets to directly reachable nodes irrespective of connectivity to a Customer Enterprise Network (CEN) and irrespective of whether a destination is a local or a foreign node. A directly reachable node is a node to which a path exists from a source node without involving a home network of the source or destination nodes. That is, packets can potentially be sent between two nodes even if one or both of a CEN of a source node and a CEN of a destination node are unreachable. A local node is a node that has an Internet Protocol (IP) address that is on the same subnetwork as the IP Address of a source node. A foreign node is a node whose IP address is not on the same subnetwork as a source node. Examples of scenarios where nodes are directly reachable include scenarios where a packet is sent from a source node to a destination node via one of, or a combination of, a vehicular area network of a mobile router, an ad-hoc network, a high risk building (HRB), or a command vehicle.

According to another aspect, some embodiments of the present invention comprise enabling transmission of a packet from a transmitting node in a mobile network to a destination node. Such a method includes tracking a presence of the destination node that is directly reachable from the mobile network. A message indicating information about the destination node is then transmitted. Such tracking can include, for example, a mobile router tracking whether nodes that have a home IP address in a network of the mobile router are currently resident in the network of the mobile router, or have roamed away and are reachable in a foreign network, or are unreachable.

According to yet another aspect, some embodiments of the present invention encompass a method for transmitting a packet from a transmitting node to a destination node, including determining a set of nodes directly reachable from the transmitting node; determining whether a destination corresponding to a data packet is in a directly reachable list and whether the destination node is directly reachable; and transmitting the data packet without using a mobile IP or IPSec tunneling protocol. Embodiments of the present invention may also include receiving a control message indicating a set of directly reachable nodes, and clearing knowledge of directly reachable nodes when a node leaves a mobile network.

According to still another aspect, some embodiments of the present invention comprise a method for transmitting a packet from a transmitting node to a destination node in a communication network, where the method includes the following: receiving and storing identification information concerning at least one foreign node that is directly reachable in the communication network; determining, using the identification information, whether the destination node is directly reachable in the communication network; determining, based on whether the destination node is directly reachable in the communication network, whether to transmit the packet to the destination node using a tunneling protocol or without using a tunneling protocol; and transmitting the packet from the transmitting node to the destination node. Embodiments of the present invention therefore enable nodes in a wireless communication network to intelligently determine whether to transmit a data packet to a destination directly or via infrastructure, so as to more efficiently transmit and receive data packets. Further, embodiments of the present invention enable nodes to physically move between subnetworks while maintaining the continuity of Internet Protocol (IP) application sessions.

Referring to FIG. 1, a network diagram 100 illustrates a method of transmitting a data packet from a first node 105-1 to a second node 105-2, according to some embodiments of the present invention. The network diagram 100 includes a customer enterprise network (CEN) 110 that is connectable to various communication networks and subnetworks. Illustrated communication networks and subnetworks include a mobile network 115, a high risk building (HRB) network 160 operating in an HRB 155, and another mobile network 120. The communication networks are shown connected to the CEN 110 through access points 165, 170 that are directly connected to the CEN 110; however, those skilled in the art will appreciate that the access points 165,170 also can be indirectly connected to the CEN 110 through various intermediate public or private networks (not shown).

Consider that the first node 105-1 is employing Mobile IP and moves from its home network, which is reachable through the CEN 110, to within range of the mobile network 115. Such movement is indicated by the dashed line 120. Further, consider that the first node 105-1 is also capable of ad hoc routing. When the first node 105-1 arrives within range of the mobile network 115, the first node 105-1 acquires a care-of IP address (CoA) and becomes a resident node of a mobile router 125-1. If the first node 105-1 then seeks to transmit a data packet to the second node 105-2, which is directly reachable from the first node 105-1, the first node 105-1 is able to transmit the data packet directly to the mobile router 125-1. The first node 105-1 is not required to transmit the data packet to a Mobile Virtual Private Network (MVPN) server 135 in the CEN 110 using, for example, an IPSec tunnel. The mobile router 125-1 can then forward the data packet directly to the second node 105-2.

According to some embodiments of the present invention, the link between the mobile router 125-1 and the nodes 105-n in the mobile network 115 can be secured using, for example, L2 encryption such as according to the Institute of Electrical and Electronics Engineers (IEEE) standard 802.11i. The first node 105-1 then maintains a list of directly reachable nodes in a directly reachable node/network table 140. The list of directly reachable nodes contains the IP address of nodes that can be securely communicated with via the mobile router 125-1. The list can be provided, for example, by the mobile router 125-1 when the first node 105-1 enters the mobile network 115 and whenever updates to the list are available. If a destination IP address of a data packet is in the directly reachable node/network table 140, then the first node 105-1 sends the data packet outside an IPSec tunnel that the first node 105-1 maintains to the MVPN server 135. That enables the mobile router 125-1 to determine the destination of the data packet and forward the data packet directly to the destination node. The mobile router can determine a destination of a data packet by a number of schemes such as, for example, observing a destination IP address in an IP header, observing an inner IP header if the data packet is carried in an IP-in-IP tunnel, and observing a routing extension header.

The directly reachable node/network table 140 can be created by various schemes. For example, such schemes include observing requests for IP addresses (such as requests made using a dynamic host configuration protocol (DHCP)), requests for IP address resolution (such as requests made using an Address Resolution Protocol (ARP) and IPv6 neighbor discovery messages), receiving directly reachable node/network information from an adjacent mobile router, receiving hello messages from a node in an ad hoc network, receiving routing information from a node in a high risk building, and receiving routing information from a command vehicle.

According to some other embodiments of the present invention, rather than reverse tunneling the data packet to the MVPN server 135 in the CEN 110, the first node 105-1 is able to transmit the data packet directly to the second node 105-2 using the single hop direct path indicated in FIG. 1 by a lightening bolt 130. Further, according to some embodiments of the present invention, the first node 105-1 employs the directly reachable node/network table 140 to store identification information concerning other nodes in the mobile network 115. The identification information can map a home Internet Protocol (IP) address of each directly reachable node in the mobile network 115 to at least one of a Medium Access Control (MAC) address and another IP address. The directly reachable node/network table 140 identifies selected destinations concerning which the first node 105-1 will not reverse tunnel data packets back to the MVPN server 135. For example, the directly reachable node/network table 140 includes a next hop destination for other visiting nodes resident in the mobile network 115, and a home IP address of such nodes. Identification information in the directly reachable node/network table 140 comprising a list of directly reachable nodes can be cleared whenever the first node 105-1 moves out of the mobile network 115.

Further, various methods can be used to discover the IP addresses of nodes identified in the directly reachable node/network table 140. For example, tags identifying an IP address of a node can be embedded in advertised control messages that are transmitted in the mobile network 115. Also, a protocol such as a reverse address resolution protocol (ARP) can be used to obtain an IP address from a Medium Access Control (MAC) address. A list in the directly reachable node/network table 140 thus maps an IP address of each directly reachable node to at least one of a Medium Access Control (MAC) address or another IP address. Further, home nodes in the mobile network 115 can be statically configured to include the IP addresses of all other locally connected nodes in the mobile network 115.

The presence of infrastructure in the mobile network 115 also can be announced to resident nodes in the mobile network 115 to enable resident nodes to use a dynamic host configuration protocol (DHCP) to obtain IP addresses. Such infrastructure can include, for example, the mobile routers 125-1 and 125-2, or an access point 145.

Figure 2:
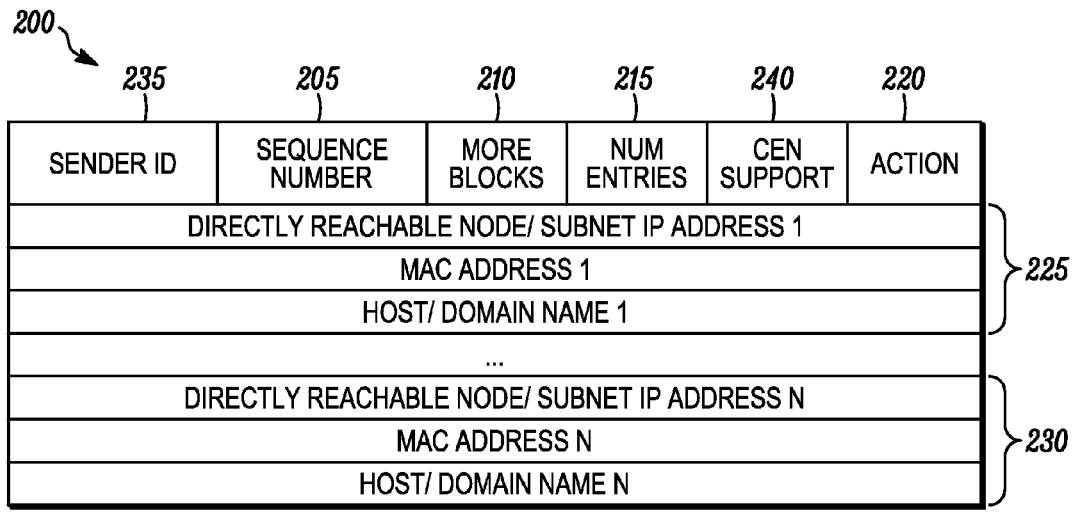
FIG. 2 is a diagram illustrating an example of a control message, according to some embodiments of the present invention.

Referring to FIG. 2, a diagram illustrates an example of a control message 200, according to some embodiments of the present invention. The control message 200 can be sent from one or more nodes in the network 115, such as from the mobile router 125-1 to the nodes 105-n connected to the mobile network 115, and to other nodes such as the mobile router 125-2 that is wirelessly connected to the mobile router 125-1 (for example via the HRB network 160). The control message 200 comprises a directly connected nodes list given in the form of <IP address, MAC address, Host/Domain name> tuples 225, 230. The control message 200 also includes fields such as a sequence number field 205, which is incremented every time a control message is received. A more blocks field 210 is set to 1 if information included in the control message 200 is not a complete list of directly connected nodes. A Num entries field 215 identifies the number of hosts in the control message 200. An Action field 220 indicates whether a purpose of the control message 200 is to add a host to the directly reachable node/network table 140 or delete a host from the directly reachable node/network table 140. Additional fields include a sender ID field 235 and a CEN support field 240.

According to some embodiments of the present invention, the control message 200 can include an indication about the types of tunnels that can be skipped (such as skip only IPSec or skip IPSec and Mobile IP reverse tunnels). The control message 200 also can include a key (for example a public key signed by the mobile router 125-1) corresponding to a directly reachable node. Further, the control message 200 can be encrypted (for example using a shared key between the mobile router 125-1 and a recipient node). The control message 200 also can be sent as an independent message or as a component of other messages, for instance as part of a router advertisement or an ad-hoc routing protocol message.

Figure 3:
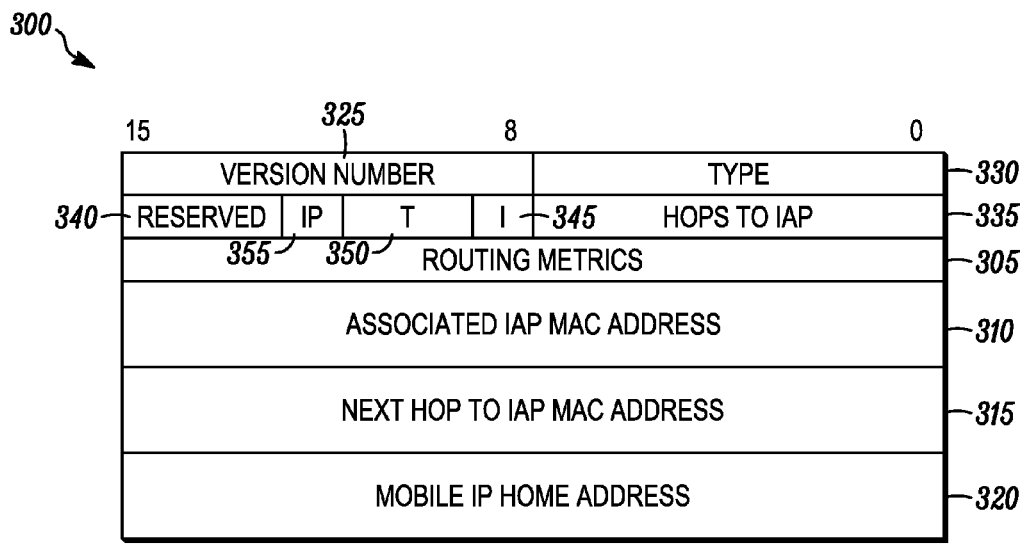
FIG. 3 is a block diagram illustrating fields of a hello message that can function as an advertised control message, according to some embodiments of the present invention.

Referring to FIG. 3, a block diagram illustrates fields of a hello message 300 that can function as an advertised control message, according to some embodiments of the present invention. The hello message 300 is used in a mesh network based on an ad hoc on-demand distance vector (AODV) routing protocol. The hello message 300 can be, for example, broadcast or multicast from each node resident in a mobile network, such as the nodes 105-1, 105-2, and 105-3 that are resident in the mobile network 115, to inform neighboring nodes of relevant routing metrics. The hello message 300 can include standard fields, such as a routing metrics field 305 that specifies routing metrics associated with a route to an intelligent access point (IAP), where the IAP acts as a bridge between a mobile network and a wired network. The routing metrics field 305 is updated at each hop along a path, and can be calculated as a function of various factors such as a number of hops, success rate along a path, and current signal strength. Further, the hello message 300 includes an associated IAP medium access control (MAC) address field 310, a next hop to IAP MAC address field 315, and a Mobile IP home address field 320. Thus, for example, when the first node 105-1 receives the hello message 300 from the second node 105-2, the first node 105-1 can use data from the Mobile IP home address field 320 to complete the directly reachable node/ network table 140. The Hello message 300 also includes a version number field 325, which specifies a version number of a protocol; a type field 330, which specifies a message type; and a hops-to-IAP leader node field 335, which specifies a number of hops to an IAP leader node. The Hello message 300 further includes a flag(s) field 340, which is reserved for future use; an I field 345, which when asserted means that a route reply (RREP) message is from an IAP; a T field 350, which indicates a type of bridge used; and an IAP MAC address field 355, which specifies the MAC address of the IAP.

Further, when a new node moves into a mobile network, the new node may receive a unicast advertisement (sent for instance from a mobile router or from a node in an ad-hoc network) identifying the directly reachable nodes. For example, such a unicast advertisement may include the home IP address of node 105-3, the MAC-address of node 105-3 and a host name of node 105-3 followed by the home subnetwork name of the mobile router 125-2, the MAC address of the mobile router 125-1, and a domain name of the mobile network 120 corresponding to the mobile router 125-2, followed by a subnetwork name of the mobile router 125-1, MAC address of the mobile router 125-1 and the domain name of the mobile router 125-1. Also, similar information about the high risk building (HRB) 155 and other networks reachable via the HRB network 160 can be included in the unicast advertisement or sent as a separate message. The mobile router 125-1 can also indicate whether it has infrastructure connectivity by using a flag. Additionally, a broadcast advertisement, such as the control message 200, can be sent (for example, from the mobile router 125-1 or from the first node 105-1) to all neighboring nodes to add an entry to a list of directly reachable nodes that identifies the first node 105-1.

According to some embodiments of the present invention, the first node 105-1 employs mobility control middleware (MCM) to complete the directly reachable node/network table 140. To ensure seamless and persistent operation of Internet Protocol (IP) application sessions operating on the first node 105-1, the MCM resides below an applications layer of an open systems interface (OSI) model of the first node 105-1, and presents a permanent address of a destination node to the applications layer. Thus, for example, concerning transmitting a data packet from the first node 105-1 to another node 105-3 resident in the mobile network 115, the MCM of the first node 105-1 presents the applications layer of the first node 105-1 with a home address of the node 105-3. The MCM also can use host and domain name information present in the directly reachable node/network table 140 to resolve domain name system (DNS) lookup requests.

The MCM can also determine that it is not appropriate in some circumstance to transmit data packets to an IP address listed in the directly reachable node/network table 140. In such case, the MCM may instruct the first node 105-1 to transmit a data packet using a tunneling protocol, including for example a Virtual Private Network (VPN) tunneling protocol.

Figure 4:
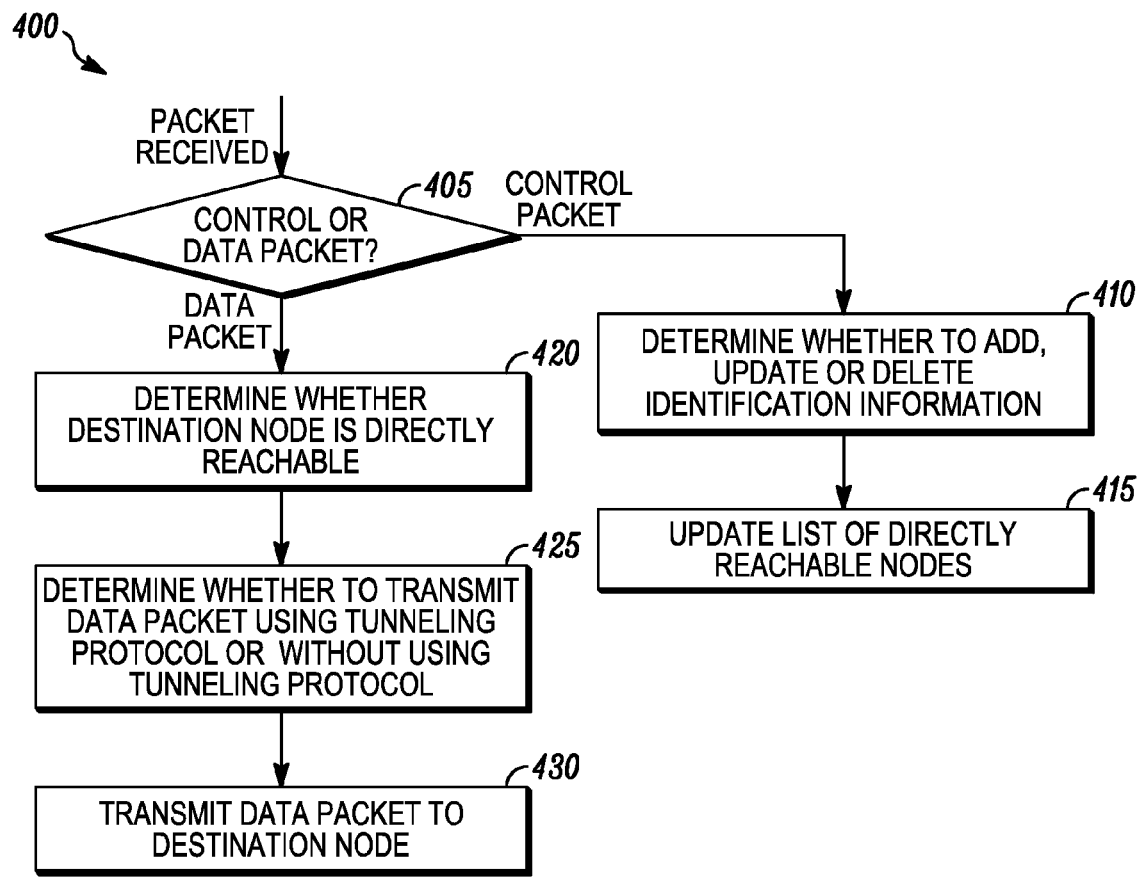
FIG. 4 is a general flow diagram illustrating a method for transmitting a packet from a transmitting node to a destination node in a communication network, according to some embodiments of the present invention.

Referring to FIG. 4, a general flow diagram illustrates a method 400 for transmitting a packet from a transmitting node to a destination node in a communication network, according to some embodiments of the present invention. At block 405, a packet is received and is checked to determine whether the packet is a data packet or a control packet. Various techniques can be used to identify a control packet including, for example, determining the presence of a specific IP extension header, determining that a packet is sent to a specific user datagram protocol (UDP) port, determining the presence of a specific option in a router advertisement message, or using a field and value in an ad hoc routing protocol Hello message. If at block 405 the packet is determined to be a control packet then, at block 410, the control packet is used to determine whether to add, update, or delete identification information concerning a node in the communication network. For example, the Action field 220 of the control message 200 can be used to indicate an appropriate action regarding the identification information. At block 415, a list of directly reachable nodes is updated. For example, the presence of an IP extension header, a control message or hello message containing a node's IP address and MAC address, or other techniques can be used to determine that the control message includes identification information concerning at least one node that is directly reachable in the communication network. For example, a control message with a known option number may be received from a mobile router 125-1, where the control message comprises a directly reachable IP address (such as an IP address corresponding to the node 105-3 or to the mobile network 120 or to the HRB network 160) and stored in a memory of the first node 105-1. Flags or fields in a control message may be used to determine whether the control message is to add or remove entries from the list of directly reachable nodes.

If, at block 405, it is determined that the packet does not contain identification information about directly reachable nodes and thus is not a control packet, then the packet is considered to be a data packet. Therefore, at block 420, it is determined, using the identification information, whether the destination node is directly reachable in the communication network. For example, the first node 105-1 determines that the second node 105-2 is directly reachable in the mobile network 115 by identifying the second node 105-2 in the directly reachable node/network table 140.

At block 425, it is determined, based on whether the destination node is directly reachable in the communication network, whether to transmit the packet to the destination node using a tunneling protocol or without using a tunneling protocol. For example, the first node 105-1 determines to transmit a data packet directly to the second node 105-2, without using a VPN tunneling protocol, because the second node 105-2 is listed in the directly reachable node/network table 140.

At block 430, the packet is transmitted from the transmitting node to the destination node. For example, the first node 105-1 transmits a data packet directly to the second node 105-2, after determining that the second node 105-2 is listed in the directly reachable node/network table 140. Alternatively, the first node 105-1 can transmit the data packet to the destination node via the mobile router 125-1. According to some embodiments of the present invention, the packet transmitted from the first node 105-1 to the mobile router 125-1 is secured using Layer 2 schemes, such as IEEE 802.11, or is secured at Layer 3 using a shared key between the first node 105-1 and the mobile router 125-1. The MAC address for a next hop then can be obtained, for instance, from the directly reachable node/network table 140.

If the node 105-1 moves outside of the mobile network 115, it can clear the directly reachable node/network table 140 and resume normal operation, including tunneling packets to the MVPN server 135. The node 105-1 can determine that it has moved outside of the mobile network 115 using various schemes including, for example, by receiving a router advertisement message from a new mobile router, using a layer 2 trigger indicating that connection to the mobile network 115 has been lost, or by recognizing a lack of response from the mobile router 125-1 to a neighbor solicitation message.

Figure 5:
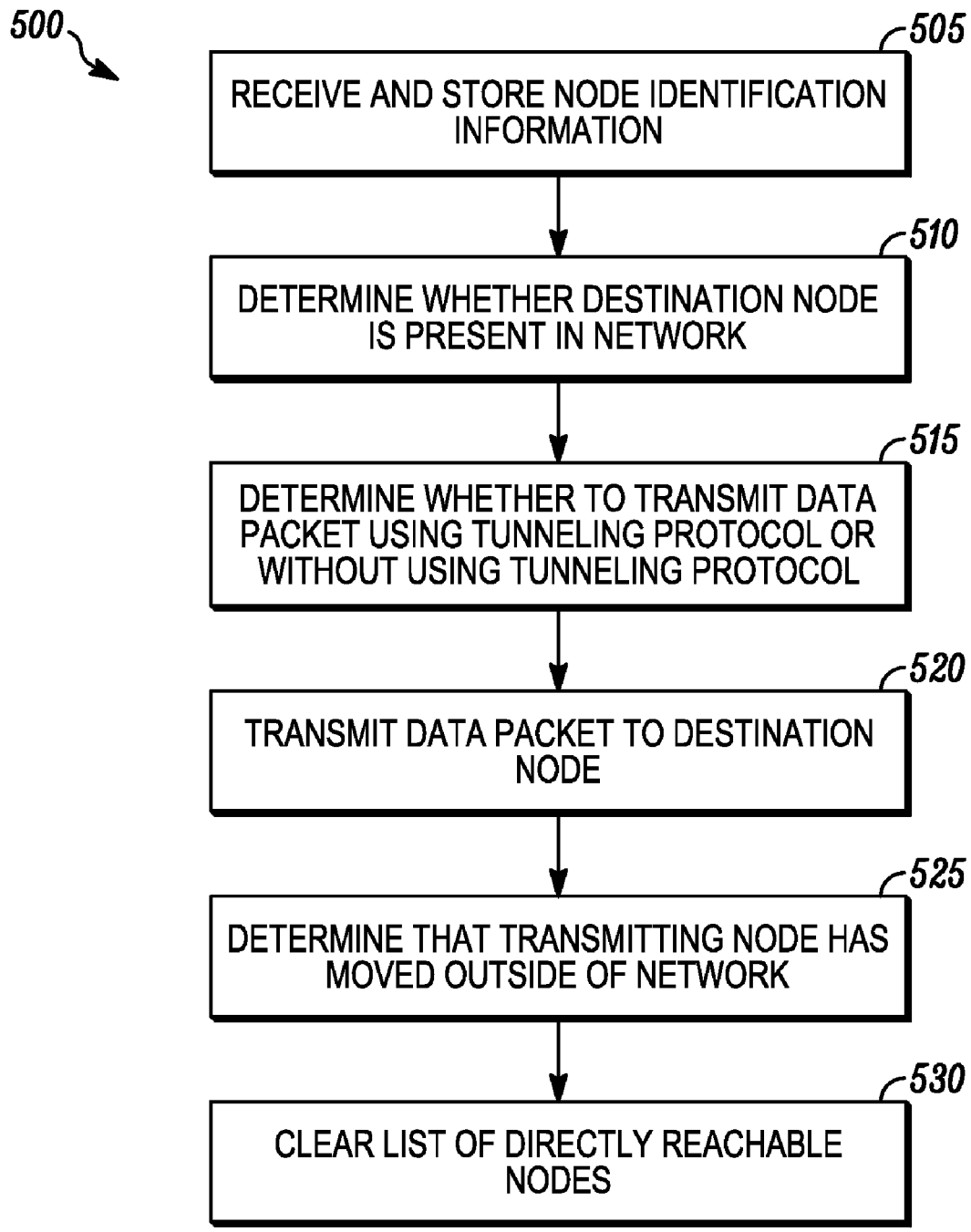
FIG. 5 is a general flow diagram illustrating a method for transmitting a packet from a transmitting node to a destination node in a communication network, according to some further embodiments of the present invention.

Referring to FIG. 5, a general flow diagram illustrates a method 500 for transmitting a packet from a transmitting node to a destination node in a communication network, according to some embodiments of the present invention. The communication network can be, for example, an ad hoc network, a mobile network, a high risk building (HRB) network, or a network that can be reached via a command vehicle. At block 505, identification information concerning at least one foreign node that is directly reachable in the communication network is received and stored. For example, an advertised control message comprising a directly reachable IP address is received from the second node 105-2 and stored in a memory of the first node 105-1.

At block 510, it is determined, using the identification information, whether the destination node is directly reachable in the communication network. For example, the first node 105-1 determines that the second node 105-2 is directly reachable in the mobile network 115 by identifying the second node 105-2 in the directly reachable node/network table 140. Directly reachable nodes can include, for example, nodes in a vehicular area network (VAN), in a high risk building (HRB) network, in a network in a building to which a mobile router is connected, in a network that can be reached from a mobile router via a mobile control vehicle, or in an ad hoc network to which a mobile router is connected.

At block 515, it is determined, based on whether the destination node is directly reachable in the communication network, whether to transmit the packet to the destination node using a tunneling protocol or without using a tunneling protocol. For example, the first node 105-1 determines to transmit a data packet directly to the second node 105-2, without using a VPN tunneling protocol, because the second node 105-2 is listed in the directly reachable node/network table 140.

At block 520, the packet is transmitted from the transmitting node to the destination node. For example, the first node 105-1 transmits a data packet directly to the second node 105-2, after determining that the second node 105-2 is listed in the directly reachable node/network table 140.

At block 525, it is determined whether the transmitting node has moved outside of the communication network. For example, it is determined whether the first node 105-1 has moved out of range of the mobile network 115.

At block 530, the list of directly reachable nodes is cleared if it is determined that the transmitting node has moved outside of the communication network. For example, if it is determined that the first node 105-1 has moved out of range of the mobile network 115, information in the directly reachable node/network table 140 is erased. Information will then again be added to the directly reachable node/network table 140 when the first node 105-1 arrives within range of another communication network.

Figure 6:
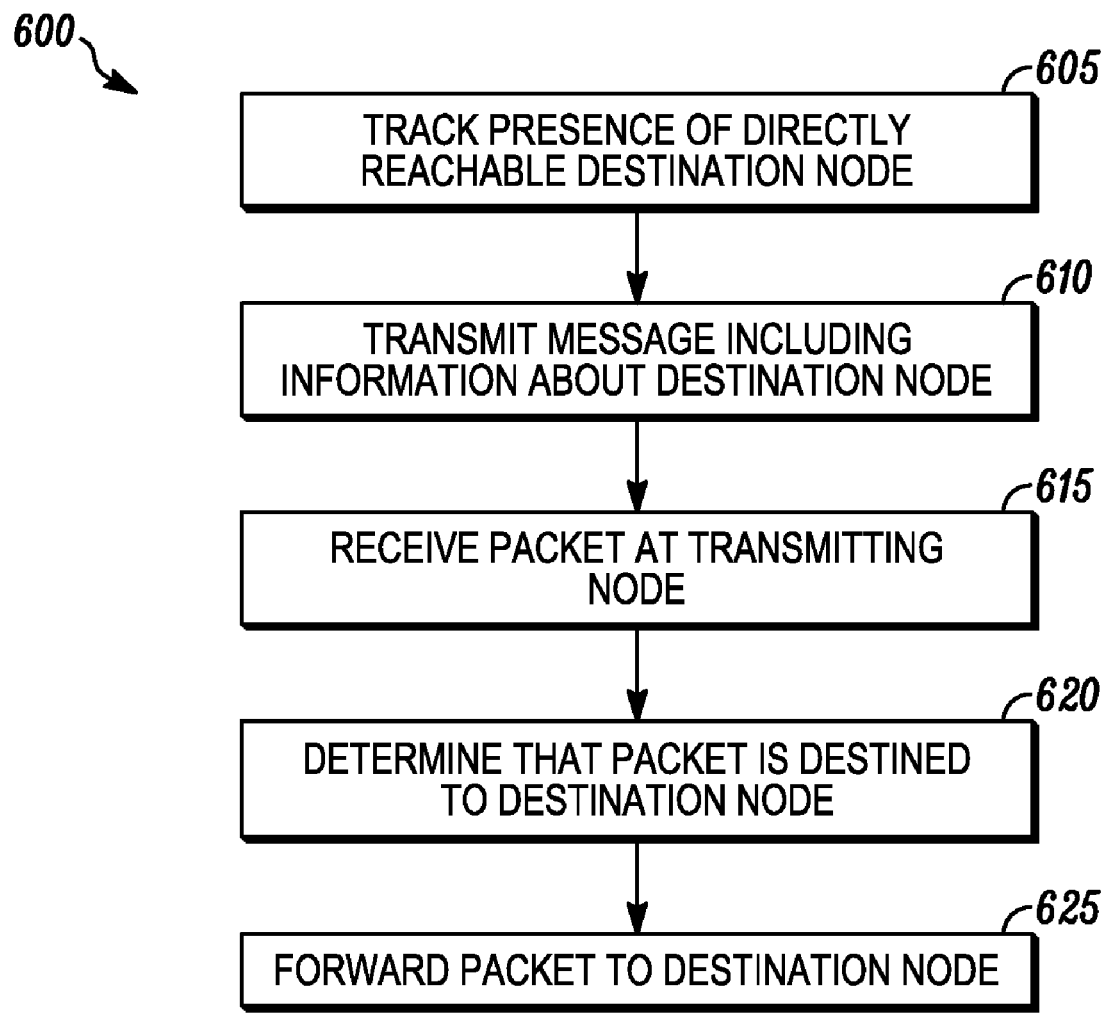
FIG. 6 is a general flow diagram illustrating a method for enabling transmission of a packet from a transmitting node in a mobile network to a destination node, according to some embodiments of the present invention.

Referring to FIG. 6, a general flow diagram illustrates a method 600 for enabling transmission of a packet from a transmitting node in a mobile network to a destination node, according to some embodiments of the present invention. At block 605, a presence of the destination node that is directly reachable from the mobile network is tracked. Tracking the presence of the destination node can include, for example, tracking the home IP address of a foreign node in a communication network, tracking the network of a mobile router connected via an ad-hoc network, or tracking the home IP address of a node connected to the communication network via a high risk building (HRB) network. Such tracking can also include a mobile router tracking whether nodes that have a home IP address in a network of the mobile router are currently resident in the network of the mobile router, or have roamed away and are reachable in a foreign network, or are unreachable. For example, the mobile router 125-1 can track the presence of the nodes 105-1, 105-2 and 105-3 in the mobile network 115, the presence of other nodes such as the node 105-4 in the HRB network 160, and the presence of the mobile network 120 corresponding to the mobile router 125-2 that is directly reachable from the mobile router 125-1. Further, tracking the presence of the mobile node can include determining that the mobile node has entered the communication network, such as the mobile network 115, and then determining that the mobile node has left the communication network.

At block 610, a message including information about the destination node is transmitted. That can include, for example, sending a broadcast advertisement to other nodes in a communication network, sending a message to a node in a high risk building (HRB), or sending a message to another node in an ad-hoc network. For example, the first node 105-1 can send a broadcast advertisement about the node 105-3 to nodes in the HRB network 160. Also, the mobile router 125-1 can send a unicast message to the node 105-1 indicating directly reachable nodes/networks. The mobile router 125-1 can also send a broadcast message to nodes in the mobile network 115 indicating the directly reachable nodes/networks, and can also share information about the mobile network 115 with other nodes in the HRB network 160.

The information about a mobile node that is transmitted to another node can include, for example, an Internet Protocol (IP) address, medium access control (MAC) address, host name, domain name, subnetwork mask, or public key concerning the mobile node. Further, the mobile node can be located in, for example, a mobile network such as the mobile network 115, a high risk building network to which a mobile router is connected such as the HRB network 160, networks that can be reached from a mobile router via a command vehicle, or an ad hoc network to which a mobile router is connected such as the mobile network 120.

The method 600 continues at block 615, where a packet is received at the transmitting node. At block 620, it is determined that the packet is destined to the destination node. Finally, at block 625, the packet is forwarded to the destination node.

Figure 7:
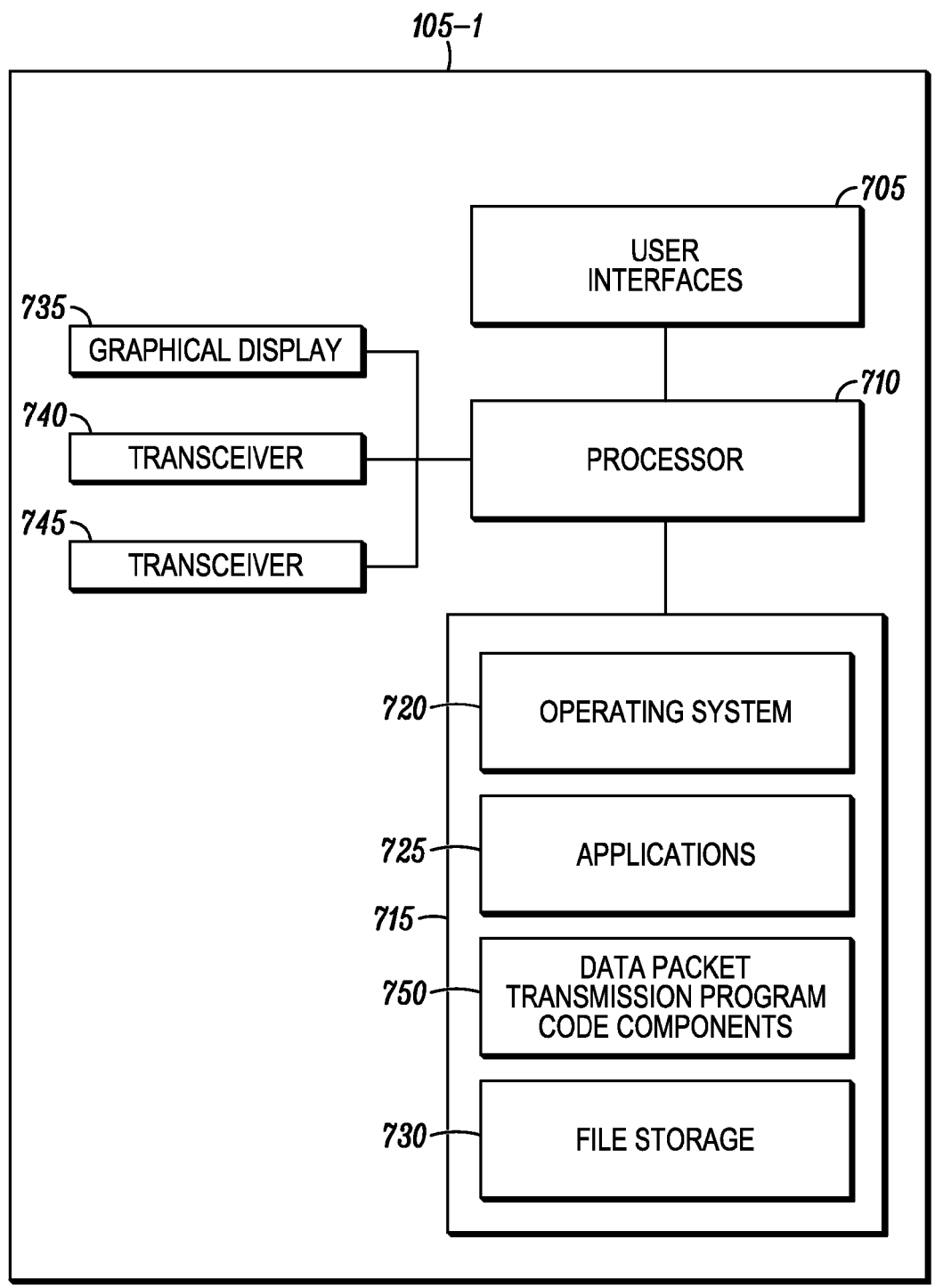
FIG. 7 is a block diagram illustrating components of a wireless communication device that can function as a node in a communication network, according to some embodiments of the present invention.

Referring to FIG. 7, a block diagram illustrates components of a wireless communication device that can function as the first node 105-1, according to some embodiments of the present invention. The first node 105-1 can be one of various types of wireless communication devices such as, for example, a mobile telephone, personal digital assistant, two-way radio or notebook computer. The first node 105-1 comprises user interfaces 705 operatively coupled to at least one processor 710. At least one memory 715 is also operatively coupled to the processor 710. The memory 715 has storage sufficient for an operating system 720, applications 725 and general file storage 730. The general file storage 730 may store, for example, values associated with the directly reachable node/network table 140 and the control message 200 or the hello message 300. The user interfaces 705 may be a combination of user interfaces including, for example, but not limited to a keypad, a touch screen, a microphone and a communications speaker. It may also have a dedicated processor and/or memory, drivers etc., is operatively coupled to the processor 710. A number of transceivers, such as a first transceiver 740 and a second transceiver 745, are also operatively coupled to the processor 710. The first transceiver 740 and the second transceiver 745 can be for communicating with various wireless communications networks, such as the mobile network 115 and the core network 110, using various standards such as, but not limited to, Evolved Universal Mobile Telecommunications Service Terrestrial Radio Access (E-UTRA), Universal Mobile Telecommunications System (UMTS), Enhanced UMTS (E-UMTS), Enhanced High Rate Packet Data (E-HRPD), Code Division Multiple Access 2000 (CDMA2000), Institute of Electrical and Electronics Engineers (IEEE) 802.11, IEEE 802.16, and other standards.

It is to be understood that FIG. 7 is for illustrative purposes only and illustrates some components of the first node 105-1 in accordance with some embodiments of the present invention, and is not intended to be a complete schematic diagram of the various components and connections between components required for all nodes that may implement various embodiments of the present invention.

The memory 715 comprises a computer readable medium that records the operating system 720, the applications 725, and the general file storage 730. The computer readable medium also comprises computer readable program code components 750 concerning transmission of data packets. When the computer readable program code components 750 are processed by the processor 710, they are configured to cause the execution of the method 400, the method 500 or the method 600, as described above, for transmitting a data packet according to some embodiments of the present invention.

Embodiments of the present invention therefore enable nodes in a wireless communication network to intelligently switch between infrastructure and ad hoc operating modes so as to more efficiently transmit and receive data packets. Further, embodiments of the present invention enable nodes to physically move between subnetworks while maintaining the continuity of Internet Protocol (IP) application sessions. These advantages can be useful in various products and circumstances, including integrated command and control systems used in fire, police, rescue or other incident scene situations, and in various mission critical local broadband (MCLB) solutions that can provide only limited infrastructure mode communications. Other applications of embodiments of the present invention include, for example, telematics in vehicle area networks (VANs), such as where vehicles cycle between vehicle-to-vehicle ad hoc mode communications and infrastructure mode communications.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for transmitting a packet from a transmitting node to a destination node in a communication network, the method comprising:
  operating the transmitting node to:
    receive a control message including an indication of one or more types of tunnels that can be skipped;
    learn identifying information which identifies directly reachable nodes through the monitoring of at least one of routing traffic or control messages;
    determine, using the identifying information, whether the destination node is directly reachable in the communication network;
    determine, using an action indication retrieved from the control message, to update stored identifying information;
    determine, based on whether the destination node is directly reachable in the communication network and the indication received in the control message, whether to transmit the packet to the destination node using a tunneling protocol or without using a tunneling protocol; and
    transmit the packet from the transmitting node to the destination node.

2. The method of claim 1, wherein the communication network comprises at least one of an ad hoc network, a mobile network, a high risk building (HRB) network, or a network that can be reached via a command vehicle.

3. The method of claim 1, wherein the identifying information comprises a list of directly reachable nodes received from at least one of: a peer in the ad hoc network, a mobile router, or a node in a high risk building (HRB).

4. The method of claim 1, wherein the tunneling protocol comprises a virtual private network (VPN) tunneling protocol or a Mobile IP tunneling protocol.

5. The method of claim 1, wherein the information identifying directly reachable nodes comprises a Home Internet Protocol (IP) address and at least one of a Medium Access Control (MAC) address and another IP address.

6. The method of claim 1, further comprising:
  determining that the transmitting node has moved outside of the communication network; and
  clearing the list of directly reachable nodes in response to determining that the transmitting node has moved outside of the communication network.

7. The method of claim 3, wherein the directly reachable nodes are in a vehicular area network (VAN), a high risk building (HRB) network, a network in a building to which the mobile router is connected, a network that can be reached from the mobile router via a mobile control vehicle, or an ad hoc network to which a mobile router is connected.

8. The method of claim 1, wherein:
  the control message comprising at least one directly reachable Internet Protocol (IP) address; and transmitting the packet from the transmitting node to the destination node, comprises transmitting the data packet to the destination node without using the tunneling protocol.

9. The method of claim 1, further comprising: transmitting identifying information concerning at least one foreign node to at least one other node in the communication network.

10. The method of claim 1, wherein the identifying information is received within a broadcast advertisement.

11. The method of claim 1, wherein the identifying information comprises at least one of an Internet Protocol (IP) address, a medium access control (MAC) address, a host name, a domain name, a subnetwork mask, or a public key.

12. A communication device comprising:
- a non-transitory computer readable storage medium having computer readable program code components configured to cause receiving of a control message including an indication of one or more types of tunnels that can be skipped;
- a non-transitory computer readable storage medium having computer readable program code components configured to cause learning identifying information which identifies directly reachable nodes through the monitoring of at least one of, routing traffic, or control messages;
- a non-transitory computer readable storage medium having computer readable program code components configured to cause determining, using the identifying information, whether a destination node is directly reachable in the communication network;
- a non-transitory computer readable storage medium having computer readable program code components configured to cause determining, using an action indication retrieved from the control message, to update stored identifying information;
- a non-transitory computer readable storage medium having computer readable program code components configured to cause determining, based on whether the destination node is directly reachable in the communication network and the indication received in the control message, whether to transmit a packet to the destination node using a tunneling protocol or without using a tunneling protocol; and
- a non-transitory computer readable storage medium having computer readable program code components configured to cause transmitting the packet from the transmitting node to the destination node.

13. The device of claim 12, wherein the communication network comprises at least one of an ad hoc network, a mobile network, a high risk building (HRB) network, or a network that can be reached via a command vehicle.

14. The device of claim 12, wherein the identifying information comprises a list of directly reachable nodes received from at least one of a peer in the ad hoc network, a mobile router, or a node in a high risk building (HRB).

15. The device of claim 12, wherein the tunneling protocol comprises a virtual private network (VPN) tunneling protocol.

16. The device of claim 12, wherein the information identifying directly reachable nodes comprises a Home Internet Protocol (IP) address and at least one of a Medium Access Control (MAC) address and another IP address.

\* \* \* \* \*